(12) United States Patent
Somashekhar

(10) Patent No.: US 6,965,737 B1
(45) Date of Patent: Nov. 15, 2005

(54) SYSTEM AND METHOD FOR TRANSPORTING DATA

(75) Inventor: Hosagrahar Somashekhar, Plano, TX (US)

(73) Assignee: Lighthouse Capital Partners IV, LP, Greenbrae, CA (US)

( * ) Notice: Subject to any disclaimer, the term of this patent is extended or adjusted under 35 U.S.C. 154(b) by 740 days.

(21) Appl. No.: 09/886,343

(22) Filed: Jun. 21, 2001

(51) Int. Cl.[7] ............................................. H04B 10/00
(52) U.S. Cl. ............................................ 398/54; 398/51
(58) Field of Search ............ 370/357–388; 398/49–57

(56) References Cited

U.S. PATENT DOCUMENTS

| | | | |
|---|---|---|---|
| 4,485,468 A * | 11/1984 | Slana | 370/358 |
| 5,555,262 A * | 9/1996 | Urbansky | 370/505 |
| 6,208,667 B1 * | 3/2001 | Caldara et al. | 370/503 |
| 6,714,537 B1 * | 3/2004 | Adam et al. | 370/360 |
| 6,781,984 B1 * | 8/2004 | Adam et al. | 370/360 |

* cited by examiner

*Primary Examiner*—Agustin Bello
(74) *Attorney, Agent, or Firm*—Sprinkle IP Law Group

(57) ABSTRACT

Systems and methods for transmitting data from one point to another by transparently converting the data from an initial form into an intermediate form for transport via a transmission or transport medium, and then converting the data back into the initial form, wherein the bit sequence and timing of the original data stream are reproduced. Timing data of the input data stream is identified and inserted into the data for transport. The timing data is extracted from the received data and used to reproduce the timing of the original data stream in the delivered data stream.

5 Claims, 6 Drawing Sheets

SYSTEM AND METHOD FOR TRANSPORTING DATA

FIELD OF THE INVENTION

The invention relates generally to systems and methods for transporting data and more particularly to systems and methods for conveying an optical data stream from a transmitting device to a receiving device, wherein the optical data is transparently converted to electrical data, transported, and converted back into optical data.

BACKGROUND OF THE INVENTION

With the increasing computing power that is available for both commercial and private use, there is an increased demand for data transfer on a number of levels. Particularly, the emergence of the Internet and the ability of businesses and individuals to easily communicate with others around the world has created a need for greater speed, quality and capacity than ever before.

One response to the demand for increased performance in data transfers has been the development of optical data transfer systems. These systems use light instead of electrical signals to carry data from one point to another. Optical data transfer systems typically have much greater bandwidth than electrical systems of comparable size and cost, and are capable of providing higher quality signals for data transmission. Ideally, a user who wishes to transport data via optical signals can transmit the data over an optical fiber which is coupled by optical routing and switching equipment to more optical fibers. The transmission of the data entirely in the form of optical signals provides for a fast, efficient and high-quality transport mechanism.

While optical data transfer systems generally have higher performance than electrical systems, electrical systems have traditionally been used. As a result, this is a more mature and well-developed technology. Further, there is a great deal of physical infrastructure which can be utilized in an electrical system. Some data transfer systems take advantage of this electrical infrastructure by employing both optical and electrical data transfer components. For example, a system may be configured to accept an optical data signal, convert this optical signal into an electrical signal, transport the electrical signal using existing switching and routing equipment, and convert the electrical signal back into an optical signal for delivery to the end-user.

The disadvantages of transporting data using a hybrid optical-electrical-optical system include bandwidth limitations arising from the electrical portions of the system, increased latency resulting from the data conversion between optical and electrical forms of the data, and increased power requirements relating to the process of converting the data between optical and electrical forms. These factors have tended to drive development toward all-optical data transport systems and away from the hybrid optical-electrical-optical systems.

There are, however, factors which weigh against the use of all-optical systems. Because the field of optical data transfer is still maturing, electrical data transfer systems are still in widespread use. Some users may therefore have a need for systems which are based on electrical data transfers, regardless of whether they also utilize optical data transfer systems. If a user already has a need for these systems, it may be impractical for the user to employ optical systems as well. There is therefore a need for systems which convert optical data to electrical data for transport and then convert the electrical data back into optical data.

Systems which are currently available for optical-electrical conversion, transport and re-conversion may not be suitable for the needs of all users. These systems are typically designed to receive frames of data in a known format (e.g., SONET,) strip away the frame information, transport the data payload, add new frame information and deliver the newly framed data. While this is acceptable to some users, other users may desire a means for transporting an unaltered optical data stream from one point to another. That is, it may be desirable to maintain the proper bit sequence (the order of the bits within the data stream) as well as the rate at which the bits occur within the data stream. This may be true for a number of reasons. For example, the data stream may not be formatted according to the appropriate framing scheme, or it may be important to maintain the timing of the data between the transmitting and receiving devices. It is therefore desirable to provide a means for performing the conversion and transport of the data in a manner which is transparent to the user.

SUMMARY OF THE INVENTION

One or more of the problems outlined above may be solved by the various embodiments of the invention. Broadly speaking, the invention comprises systems and methods for transmitting data from one point to another by transparently converting the data from an initial form into an intermediate form for transport via a transmission or transport medium, and then converting the data back into the initial form, wherein the bit sequence and timing of the original data stream are reproduced.

One embodiment of the present invention comprises a method wherein the initial form of the data is that of an optical data stream. This optical data stream is converted into an electrical data stream and formatted for transport across an electrical transmission medium such as an electrical switching matrix. The electrical data stream may include packet headers, frame data or other overhead information which is not present in the original data stream, but which is necessary for transmission of the data through the transmission medium. After the electrical data is transported by the transmission medium, it is converted back into an optical data stream for delivery to a destination device. The conversion of the electrical data stream back into an optical data stream involves the reformatting (or unformatting) and removal of any overhead information which was needed for transport so that the original sequence of bits is restored. The conversion further involves the generation of the optical data stream such that its timing matches that of the original data stream (i.e., the data rate is the same.) The resulting optical data stream should therefore be substantially identical to the original optical data stream.

One embodiment of the present invention comprises a system configured to accept an optical data stream, convert the optical data stream into an electrical data stream for transmission through an electrical transport medium and convert the electrical data stream back into an optical data stream having the same bit sequence and timing as the original optical data stream. In this embodiment, the system comprises an ingress module and an egress module which are coupled together by a transmission medium. The ingress module includes an optical-electrical converter configured to convert the initial optical data stream into an electrical data stream. The output of the converter is coupled to a buffer which is configured to store the bits of the data stream.

A counter is coupled to the buffer and configured to count the bits as they are stored in the buffer. Write logic in the ingress module is coupled to the buffer and to a timer, and is configured to determine the number of bits which are stored in the buffer during a predetermined interval. (Because the write logic determines the timing of the data stream, in counts per interval, it may also be referred to as timing logic.) The bit count for this interval is stored in the buffer by the write logic. The data in the buffer of the ingress module is read out and transported over the transmission medium to the egress module. The data may be formatted into packets or frames, or it may be reformatted in some other manner for transport to the egress module. The data is converted back into the data stream which was read out of the ingress module buffer for delivery to the egress module. The egress module includes a buffer for storing the received data stream. The data is read out of the egress module buffer at a rate determined by a phase locked loop and is converted back into an optical signal. The bit counts which are embedded in the data stream are not read out in this manner, but are instead extracted and conveyed to timing logic within the egress module. The timing logic is coupled to a timer and to a counter which is configured to count the bits as they are read out of the egress module buffer. The timing logic is configured to determine the number of bits which are read out of the buffer in a predetermined time interval (which is equal to the time interval used by the ingress module write logic.) The timing logic compares this bit count to the embedded bit count and adjusts the frequency of the PLL accordingly (if the counts match, there is no adjustment; if the ingress module count is greater than the egress module count, the frequency is increased; and if the ingress module count is less than the egress module count, the frequency is decreased.)

One embodiment of the present invention comprises a system which provides both conventional data transport, in which frames of optical data are delivered in a modified form, and transparent data transport, in which the data is delivered in a form which is substantially identical to the form in which it was received. A conventional data transport path in the system comprises an ingress module, a switching matrix and an egress module. The original optical data stream is received by the ingress module, converted to an electrical signal and formatted for transport via the switching matrix. The signal is received by the egress module and converted back into an optical signal. The second optical signal normally has different frame data (or other overhead information) than the first optical signal as a result of being transported through the switching matrix. A transparent data transport path in the system comprises an ingress module, the same switching matrix used by the conventional data transport path and an egress module. The optical data stream received by ingress module is converted to an electrical signal and formatted for transport by the switching matrix. The electrical signal is received by an egress module and is converted by the egress module back into an optical signal. The second optical signal is substantially identical to the first signal. The system is therefore capable of transporting data either in a first mode, in which the data may arrive in a slightly different form than it was originally transmitted, or in a second mode, in which the delivered data stream is substantially identical to the original data stream.

Numerous alternative embodiments are also possible.

BRIEF DESCRIPTION OF THE DRAWINGS

Other objects and advantages of the invention may become apparent upon reading the following detailed description and upon reference to the accompanying drawings in which.

Figure 1:
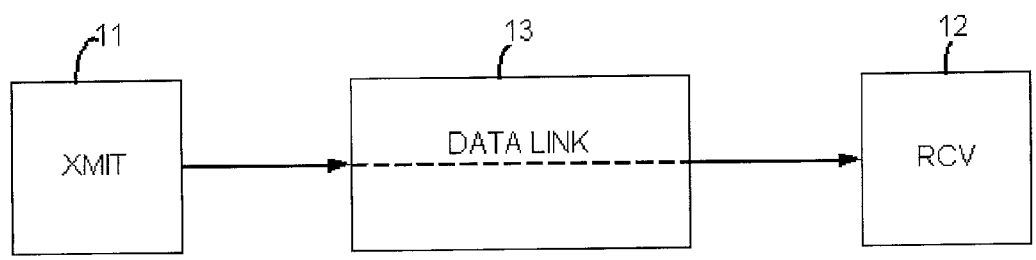
FIG. 1 is a diagram illustrating the transmission of an optical data stream from the perspective of the owner of the data stream.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF A PREFERRED EMBODIMENT

A preferred embodiment of the invention is described below. It should be noted that this and any other embodiments described below are exemplary and are intended to be illustrative of the invention rather than limiting.

Broadly speaking, the invention comprises systems and methods for transmitting data from one point to another by transparently converting the data from an initial form into an intermediate form for transport via a transmission or transport medium, and then converting the data back into the initial form, wherein the bit sequence and timing of the original data stream are reproduced. One embodiment is configured to convert an optical signal to an electrical signal and store the corresponding data in a buffer. The number of bits in the signal in a predetermined interval is counted and stored in the buffer with the data. The data in the buffer is read out and formatted for transport over a switching matrix. After the data is transported, it is unformatted and the bit counts are extracted. The data is then stored in a second buffer, while the bit counts are transmitted to a timing logic circuit. The data is read out of the buffer at a rate determined by a PLL. The timing logic circuit is configured to determine the bit count of the data read out of the buffer, compare it to the bit count extracted from the received data stream, and adjust the PLL frequency to cause the bit counts to match.

Referring to FIG. 1, a diagram illustrating the transmission of an optical data stream is shown from the perspective of the owner of the data stream (i.e., the user who wishes to transmit the data stream.) In this figure, data (the data stream) is shown being transferred from a first, transmitting device 11 to a second, receiving device 12. The data stream is conveyed from transmitting device 11 to receiving device 12 via a data link 13. Data link 13 is depicted with a dashed line extending therethrough to indicate that the transmission of the data through this link is transparent to devices 11 and 12. In other words, the optical data stream which is produced by transmitting device 11 is reproduced in substantially identical form before it is delivered to receiving device 12, even though the data may be transported through data link 13 in a vastly different form.

Figure 2:
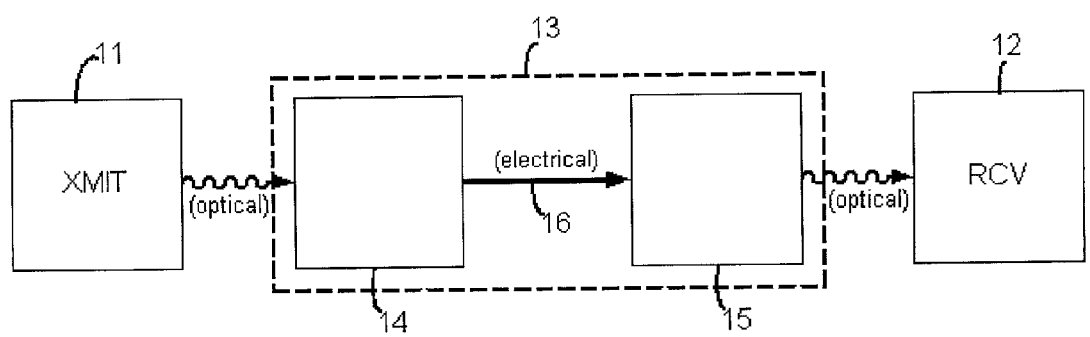
FIG. 2 is a diagram illustrating the transmission of an optical data stream from the transmitting device to the receiving device from the perspective of the data link.

Referring to FIG. 2, a diagram illustrating the transmission of an optical data stream from the transmitting device to the receiving device is shown from the perspective of the data link. In this figure, it can be seen that transmitting device 11 produces an optical data stream which is delivered to data link 13 at a first point. Data link 13 converts the optical data stream to an electrical data stream, conveys the electrical data stream to a second point, converts the electrical data stream back into an optical data stream, and delivers the optical data stream to receiving device 12.

In the embodiment of FIG. 2, data link 13 is depicted as comprising a first component 14, a second component 15 and an electrical transmission medium 16 which couples the first and second components together. First component 14 is configured to receive the optical data stream from transmitting device 11 and to convert the optical data stream into an electrical data stream. The electrical data stream is then transmitted over data transport medium 16 to second component 15, which converts it back into an optical signal for delivery to receiving device 12a. Although data transport medium 16 is depicted as a simple connection between component 14 and 15, it should be noted that it need not be a mere signal line, and may instead comprise a complex switching and routing system. In such a case, it is likely that component 15, which is configured to receive the electrical signal and convert it back into an optical signal, may be one of many possible destination devices to which the data stream may be routed. Further, the data stream and need not be maintained only as an electrical signal during transport by data transport medium 16—the data transport medium may incorporate a combination of components which may transport data in a variety of forms (e.g., as both electrical and optical data.) For instance, first component 14 may convert the optical signal to an electrical signal, process the electrical signal, convert the electrical signal into an optical signal, and then transmit the optical signal over data transport medium 16 to second component 15. Data transport medium 16 should therefore be broadly viewed as comprising any medium or means for transporting data from one point to another.

Figure 3:
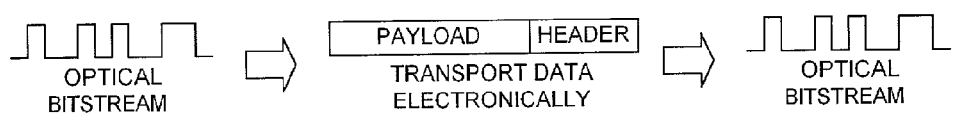
FIG. 3 is a diagram illustrating the form of the data as it is transported from a transmitting device to a receiving device in accordance with one embodiment of the present invention.

Referring to FIG. 3, a diagram illustrating the form of the data as it is transported from a transmitting device to a receiving device in accordance with one embodiment of the present invention is shown. In this figure, the optical data stream produced by the transmitting device is depicted as a signal 21 comprising a square wave. Optical signal 21 comprises pulses of light which correspond to the binary 1's of the data stream. (Other embodiments may employ different signals.) The pulses are clocked at a particular rate which is characteristic of the signal. After the optical signal is converted into an electrical signal, the corresponding data can be easily manipulated. For example, the data can be stored as a number of corresponding bits in a buffer. These bits can be formatted in packets 22 (or frames, or some other manner of formatting) for transport over an electrical transmission medium. If data stream data is formatted into a packet, the data may form the payload 24 of the packet and may be accompanied by overhead information such as a packet header 25. Generally speaking, when the bits are transmitted in this manner, the clocking information which was inherent in the original optical signal is lost. Some means must therefore be provided to preserve this timing information so that the optical signal 23 which is produced for delivery to the receiving device will have not only correctly ordered bits, but also the same timing as the original optical data stream.

Figure 4:
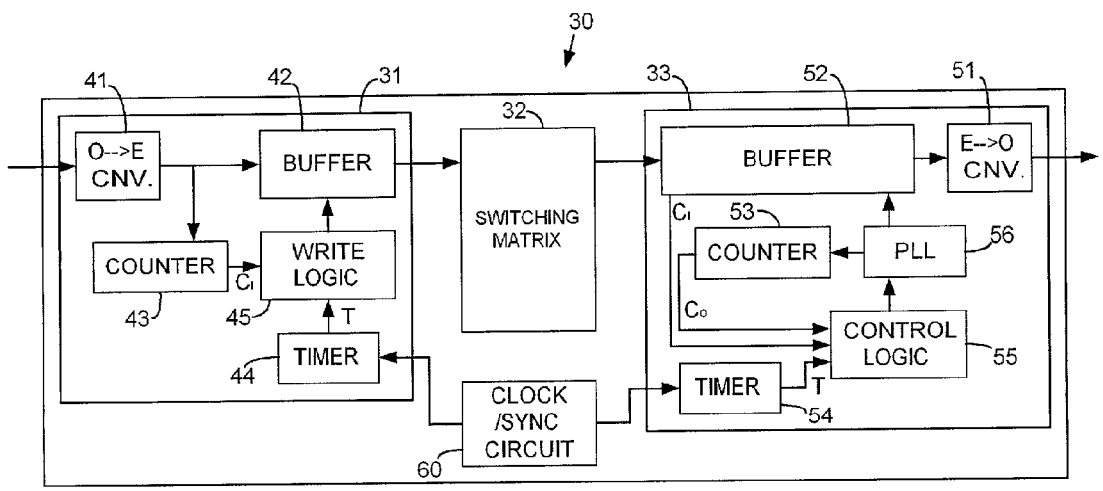
FIG. 4 is a diagram illustrating an exemplary embodiment of a system for transparently transporting an optical data stream over an electrical transmission medium.

Referring to FIG. 4, a diagram illustrating an exemplary embodiment of a system for transparently transporting an optical data stream over an electrical transmission medium is shown. (In actuality, the transmission medium may be electrical, optical, or a hybrid of the two, depending upon the particular embodiment.) System 30 comprises three primary components: ingress module 31; switching matrix 32; and egress module 33. Switching matrix 32 corresponds generally to transmission medium 16 of FIG. 2. Ingress module 31 and egress module 33 correspond to components 14 and 15 of FIG. 2, respectively.

In this embodiment, ingress module 31 comprises an optical-to-electrical (o-e) converter 41, a buffer 42, a counter 43, a timer 44 and write logic 45. Egress module 33 comprises an electrical-to-optical (e-o) converter 51, a buffer 52, a counter 53, a timer 54, timing logic 55 and phase locked loop (PLL) 56. Timers 44 and 54 are both based on common clock and synchronization signals generated by clock/sync circuit 60.

An optical signal is received by o-e converter 41 and is converted into an electrical signal. The bit sequence and timing of the electrical signal are identical to those of the optical signal. O-e converter 41 (as well as e-o converter 51) may implement a conventional design for this conversion. Because such designs are well known, the structure of the converter will not be described in further detail in this disclosure. The electrical signal generated by o-e converter 41 is forwarded to buffer 42, which is configured to store the data bits represented by the signal. The data is stored in buffer 42 until it can be transported to egress module 33. The electrical signal generated by o-e converter 41 is also transmitted to counter 43. Counter 43 is configured to provide to write logic 45 a count of the number of bits of the data stream which are received by buffer 42. Write logic 45 is also configured to receive a timing signal from timer 44. Based upon the count information received from counter 43 and the timing information received from timer 44, write logic 45 is configured to determine the number of bits which are received by buffer 42 in a given time period.

Since it is assumed that o-e converter 41 converts the optical data stream into an electrical data stream in real-time, the rate at which bits are received by buffer 42 is the same as the bit rate of the optical data stream. Consequently, the number of the data bits received by the buffer (as indicated by the count received from counter 43) during the interval signaled by timer 44 corresponds to the data rate of the input optical stream. This information is conveyed with the data bits from ingress module 31 to egress module 33 so that the correct timing can be generated for the optical data stream produced by e-o converter 51. The timing information is conveyed by inserting the bit count (Ci) corresponding to time interval (T) in buffer 42. Thus, the bit count becomes part of the data stream which is transmitted from ingress module 31 to egress module 33.

The data which is stored in buffer 42 (including the bits of the original data stream and the periodic bit count, Ci) is read out of the buffer and transmitted to switching matrix 32. The data may be formatted as necessary for transport over the switching matrix (e.g., it may be formatted into packets or frames with corresponding header or frame overhead data.) Switching matrix 32 is configured to deliver the data stream to buffer 52 of egress module 33. Switching matrix 32 may comprises any type of switching system, network or other medium for transmitting data from one point to another. For the purposes of this disclosure, "switching matrix" is used to refer not only to systems of interconnected switches or other routing devices, but also to simple transmission media, such as a direct, hard-wired connection between the ingress and egress modules.

The data which is transmitted through switching matrix 32 is received by buffer 52 of the egress module. As the data is received, it is reformatted (or unformatted) if necessary and stored in buffer 52. The bit count Ci which was inserted into the data stream by ingress module 31, is extracted from the data stream and forwarded to timing logic 55. The bit count may be read out of the data stream so that it is not stored in buffer 52, or it may be stored in the buffer and then read out (and removed from the data stream) prior to forwarding the data stream to e-o converter 51.

Buffer 52 is configured so that data is read out of the buffer at a rate which is controlled by phase locked loop (PLL) 56. PLL 56 is coupled to receive control data from timing logic 55, which is in turn coupled to buffer 52 and counter 53 to receive the input bit count, Ci (which was embedded in the data stream received from ingress module 31,) and the output bit count, Co (which is generated by counter 53.) Timing logic 55 is also coupled to timer 54, which is configured to produce a timing signal to indicate intervals T over which output bit count Co is determined. The interval T which is measured by timer 54 is identical to the interval T which is measured by timer 44 (which is the reason for running both timers based upon the same clock and synchronization signals.) The purpose of providing the input and output bit counts to timing logic 55 is to allow these counts to be compared and to enable timing logic 55 to adjust PLL 56 so that the input and output bit counts are the same.

Timing logic 55 is configured to determine the difference between input bit count Ci and output bit count Co. If the input bit count is greater then the output bit count, timing logic 55 increases the frequency of PLL 56 in order to increase the next output bit count. If the input bit count is less than the output bit count, timing logic 55 decreases the frequency of PLL 56 in order to decrease the next output bit count. By matching the input and output bit counts over identical intervals, timing logic 55 and PLL 56 cause the timing information of the original data stream to be reproduced in the output data stream. Once the bit counts have been equalized, it is contemplated that there will be little, if any, need to further adjust the frequency of the PLL. Nevertheless, the comparison is continued in this embodiment in case the need for adjustment arises.

Because o-e converter 41 and e-o converter 51 operate in real-time and do not affect the timing between the optical and electrical signals, the input and output data streams match with respect to both the pair of electrical data streams and the pair of optical data streams. Since both the bit sequence and timing of the data stream are maintained between the input and output data streams, they are essentially indistinguishable, and the transmission through data link 30 is transparent.

Figure 5:
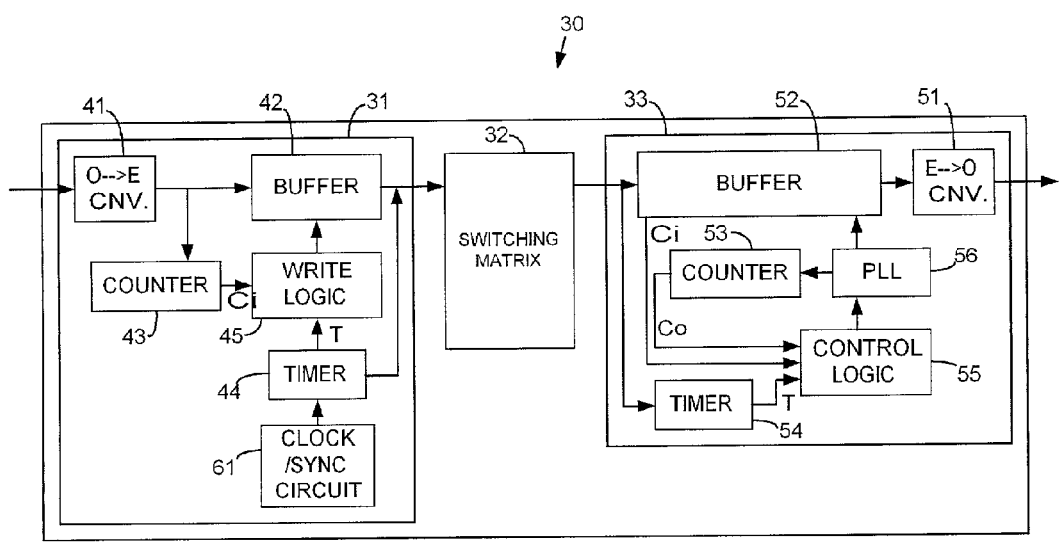
FIG. 5 is an alternative embodiment of the present system in which a clock/sync circuit in the ingress module is transmitted to the egress module along with the data stream.

In the embodiment described above, the clock and synchronization signals provided to timers 44 and 54 are each provided by a common source (clock/sync circuit 60.) It is not necessary, however, that these signals originate at a common source. In some situations, this may, in fact, be impractical. Referring to FIG. 5, an alternative embodiment of the present system is shown in which a clock/sync circuit in the ingress module is transmitted to the egress module along with the data stream. It should be noted that identical reference numerals in FIGS. 4 and 5 indicate identical components (though the respective configurations of the components may vary to accommodate the differences between the designs.)

In the embodiment of FIG. 5, it is not necessary to provide a common clock/sync signal and to deliver this signal separately to the respective timers of the ingress and egress modules, which may be located at a great distance from each other. Instead, these signals are generated by a clock/sync circuit 61 which is incorporated into ingress module 31. The signals are provided directly to timer 44 and are used by this timer in the same manner as in the embodiment of FIG. 4. The signals are, however, also incorporated into the electrical signal which is transmitted to switching matrix 32. The signal is conveyed to egress module 33, where the clock/sync signal is extracted from the received signal and delivered to timer 54. The signals are used by timer 54 in the same manner as described above in regard to FIG. 4. (It should be noted that, because methods for transmitting timing information with associated data in this manner are well-known, they will not be described in further detail here.)

It should be noted that, while the embodiments described above in regard to FIGS. 4 and 5 incorporate o-e and e-o converters into the ingress and egress modules, respectively, the converters may not be included in some other embodiments of the present system. Such alternative embodiments may be configured to accept an electrical signal, identify timing information associated with the signal (e.g., input bit count per time interval,) transport the timing information and the data which was embodied in the original electrical signal, and finally generate an output electrical signal which reproduces the bit sequence and timing information of the original electrical signal. One such embodiment could conform to the description of the system depicted in FIG. 4 (or as depicted in FIG. 5) in all respects other than the conversion between optical and electrical data streams.

Figure 6:
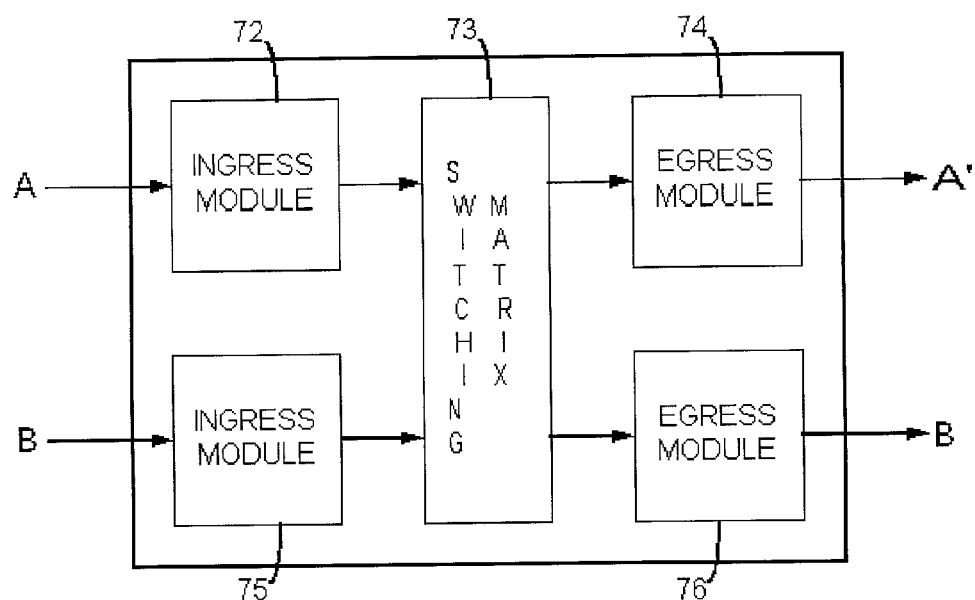
FIG. 6 is a diagram illustrating a system according to another alternative embodiment of the present invention.

Referring to FIG. 6, a diagram illustrating a system according to another alternative embodiment of the present invention is shown. In this figure, the system is depicted as a high-level functional block diagram. The system 70 incorporates a pair of ingress modules 72, 75, a pair of egress modules 74, 76, and a switching matrix 73 which is coupled between the ingress and egress modules. System 70 provides both conventional data transport, in which frames of optical data are delivered in a modified form, and transparent data transport, in which the data is delivered in a form which is substantially identical to the form in which it was received.

As shown in FIG. 6, the conventional data transport path comprises ingress module 72, switching matrix 73 and egress module 74. The original optical data stream (A) is received by ingress module 72, converted by ingress module 72 to an electrical signal and formatted for transport, transported via switching matrix 73 to egress module 74, and converted by egress module 74 back into an optical signal (A'). As mentioned above, conventionally transported signals A and A' typically have different frame data (or other overhead information) as a result of being transported through the switching matrix. Optical stream B, on the other hand, traverses a transparent data transport path through system 70. This path comprises ingress module 75, switching matrix 73 and egress module 76. Original optical data stream (B) is received by ingress module 75, converted by ingress module 75 to an electrical signal and formatted for transport, transported by switching matrix 73 to egress module 76, and converted by egress module 76 back into an optical signal (B). Optical signal B is substantially identically reproduced after traversing the data transport path. While the transport of the data stream over this path may not be accomplished as efficiently as in a system which maintains the optical form of the data stream during transport (as opposed to converting the optical data stream into an electrical data stream,) the transport of the data is accomplished using the same system and some of the same components (e.g., the same switching matrix) as the conventional data path. As a result, the system may provide a more cost-effective solution than separate optical-electrical-optical and optical-optical-optical systems for a user who requires both types of transport.

Figure 7:
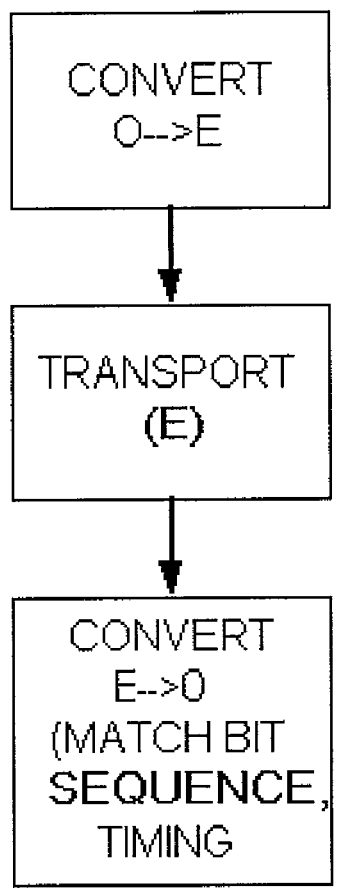
FIG. 7 is a flow diagram illustrating one embodiment of a method in accordance with the present disclosure.

Referring to FIG. 7, a flow diagram illustrating one embodiment of a method in accordance with the present disclosure is shown. In this embodiment, the method comprises converting an optical signal into an electrical signal, transporting the electrical signal, and converting the electrical signal back into an optical signal in such a manner that the bit sequence and timing information of the original optical signal are reproduced. This method broadly characterizes the operation of the system depicted in FIG. 4, in which an optical signal is converted to an electrical signal by ingress module 31, the electrical signal is transported by switching matrix 32, and the electrical signal is converted back into an optical signal with the appropriate timing by egress module 33.

Figure 8A:
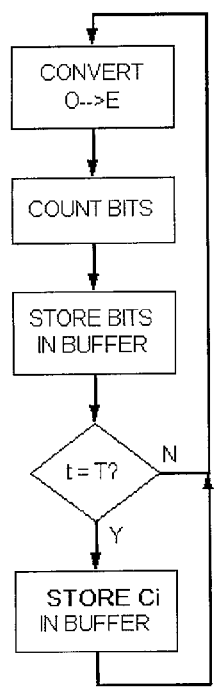
FIGS. 8A–8C are a set of flow diagrams illustrating in more detail the operation of the system depicted in FIG. 4.
Figure 8B:
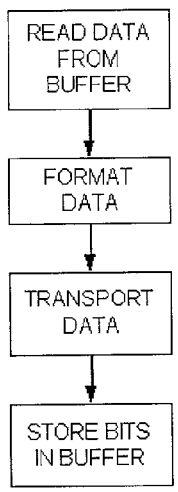
Figure 8C:
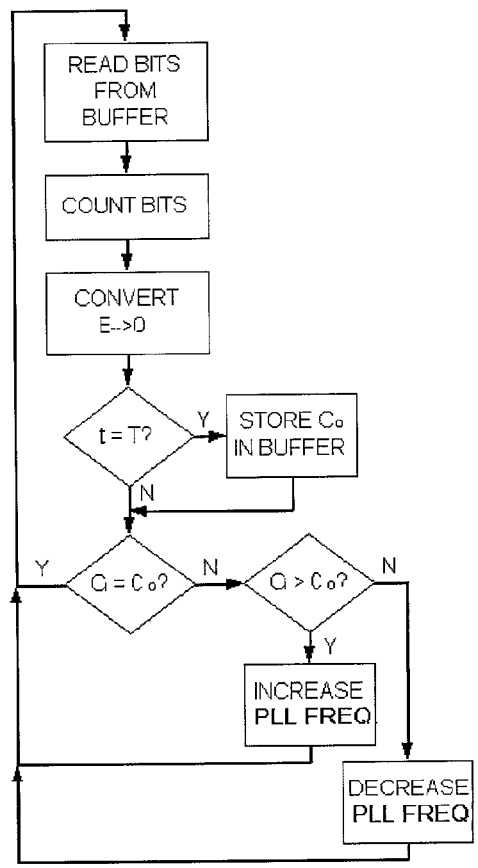

Referring to FIGS. 8A–8C, a set of flow diagrams illustrating in more detail the operation of the system depicted in FIG. 4 are shown. Because of the continuous operation of each of the different portions of the system (i.e., the ingress module, the switching matrix and the egress module,) the operation of the overall system is conveniently illustrated by separate flow diagrams which depict the operation of each of the individual portions. FIGS. 8A–8C roughly correspond to the components of flow diagram of FIG. 7. Thus, FIG. 8A corresponds to the operation of the ingress module, FIG. 8B corresponds to the operation of the switching matrix, and FIG. 8C corresponds to the operation of the egress module.

In FIG. 8A, the optical signal is first converted to an electrical signal. The bits of the data stream embodied in the electrical signal are counted as they are received by the buffer and are stored. At regular intervals, a count (Ci) of the number of bits stored in the buffer during the preceding interval is also stored.

As shown in FIG. 8B, the bits of the data stream (now including the periodic bit counts) are read from the buffer of the ingress module. These data bits are formatted as necessary and transmitted through the switching matrix. The transmitted data is then returned to its original format (if necessary) and delivered to the buffer of the egress module, where it is stored in the module's buffer. It should be noted that, if the switching matrix comprises a simple transmission medium directly connected between the ingress and egress modules, reformatting of the data for transmission may not be required—the data bits may simply be transmitted from one module to the other. If, on the other hand, the switching matrix is more complex (e.g., it comprises a fabric of switches which can route the data to various destination devices,) it may be necessary to format to the data (e.g., into packets or frames) for transport through the switching matrix.

As shown in FIG. 8C, the data bits are read out of the buffer of the egress module at a frequency determined by the phase locked loop. The bits are counted as they are read out of the buffer and, at regular intervals, the output bit count is stored. As an input bit count is encountered in the data stream, it is compared with the current output bit count. If the bit counts match, the PLL frequency is not adjusted. If the input bit count is greater than the output bit count, the PLL frequency is increased. If the input bit count is less than the output bit count, the PLL frequency is decreased.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system for transparently transporting data comprising:
    an ingress module configured to convert a first data stream to an second data stream,
    wherein the ingress module comprises
        an ingress buffer configured to store the first data stream,
        an ingress counter configured to count the bits of the first data stream which are stored in the ingress buffer,
        an ingress timer, and
        write logic coupled to the ingress counter and the ingress timer and configured to determine the data rate of the first data stream, wherein the write logic is further configured to periodically write the data rate of the first data stream into the ingress buffer;
    an egress module configured to receive the second data stream and to convert the second data stream to a third data stream, wherein the egress module is configured to reproduce the bit sequence and timing of the first data stream in the third data stream,
    wherein the egress module comprises
        an egress buffer configured to store the second data stream,
        a phase locked loop (PLL) configured to control the rate at which data is read out of the egress buffer to produce the third data stream,
        an egress counter configured to count the bits of the third data stream,
        timing logic coupled to the egress counter and the egress timer and configured to determine the data rate of the third data stream and to control the PLL to match the data rate of the third data stream to the data rate of the first data stream; and
    a transport medium coupled between the ingress module and the egress module and configured to convey the second data stream from the ingress module to the egress module.

2. The system of claim 1 wherein the timing logic is configured to determine a difference between the data rate of the first data stream and the data rate of the third data stream, and wherein the timing logic is configured to increase the frequency of the PLL if the data rate of the first data stream is greater than the data rate of the third data stream and to decrease the frequency of the PLL if the data rate of the first data stream is less than the data rate of the third data stream.

3. The system of claim 1 wherein the ingress module is configured to transmit a clock signal with the second data stream, wherein the ingress module is configured to determine the data rate of the first data stream based upon the clock signal, and wherein the egress module is configured to determine the data rate of the third data stream based upon the clock signal.

4. The system of claim 1 wherein the first data stream is an optical data stream, the second data stream is an electrical data stream, and the third data stream is an optical data stream, wherein the ingress module further comprises an optical-to-electrical converter and wherein the egress module further comprises an electrical-to-optical converter.

5. A system for transparently transporting optical data over a electrical medium comprising:

an ingress module configured to convert a first optical data stream to an electrical data stream;

an egress module configured to receive the electrical data stream and to convert the electrical data stream to a second optical data stream;

wherein the egress module is configured to reproduce the bit sequence and timing of the first optical data stream in the second optical data stream;

wherein the egress module comprises a buffer configured to store the electrical data stream, a phase locked loop (PLL) configured to control the rate at which data is read out of the buffer, a counter configured to count the bits of the data stream which are read out of the buffer, and an electrical-optical converter configured to convert the bits of the data stream which are read out of the buffer to the second optical data stream;

timing logic coupled to the counter and configured to determine the number of bits of the data stream which are read out of the buffer during each of a second plurality of regular intervals; and wherein the timing logic is coupled to the PLL, wherein the timing logic is configured to determine a difference between the number of bits of the data stream which are stored in the buffer during one of the intervals and the number of bits of the data stream which are read out of the buffer during one of the intervals, and wherein the timing logic is configured to increase the frequency of the PLL if the number of bits of the data stream which are stored in the buffer is greater than the number of bits of the data stream which are read out of the buffer and to decrease the frequency of the PLL if the number of bits of the data stream which are stored in the buffer is less than the number of bits of the data stream which are read out of the buffer.

\* \* \* \* \*